United States Patent
Kim et al.

(10) Patent No.: US 10,922,200 B2
(45) Date of Patent: Feb. 16, 2021

(54) MEMORY SYSTEM AND METHOD OF OPERATING THE SAME

(71) Applicant: SK hynix Inc., Gyeonggi-do (KR)

(72) Inventors: Se Hyun Kim, Seoul (KR); Jin Woong Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 118 days.

(21) Appl. No.: 15/856,972

(22) Filed: Dec. 28, 2017

(65) Prior Publication Data

US 2018/0373605 A1 Dec. 27, 2018

(30) Foreign Application Priority Data

Jun. 23, 2017 (KR) .......................... 10-2017-0079942

(51) Int. Cl.
*G06F 11/20* (2006.01)
*G06F 1/3234* (2019.01)
(Continued)

(52) U.S. Cl.
CPC ........ *G06F 11/2094* (2013.01); *G06F 1/3275* (2013.01); *G06F 3/064* (2013.01); *G06F 3/065* (2013.01); *G06F 3/0619* (2013.01); *G06F 3/0625* (2013.01); *G06F 3/0634* (2013.01); *G06F 3/0659* (2013.01); *G06F 3/0679* (2013.01); *G06F 3/0685* (2013.01); *G06F 3/0688* (2013.01); *G06F 11/1048* (2013.01); *G06F 11/1076* (2013.01); *G06F 11/1666* (2013.01); *G06F 2201/805* (2013.01)

(58) Field of Classification Search
CPC ............. G06F 11/2056; G06F 11/2094; G06F 11/1048; G06F 3/0688; G06F 3/0679; G06F 3/064; G06F 3/0619; G06F 11/1076; G06F 3/0685; G06F 3/0634; G06F 3/0659; G06F 3/065; G06F 3/0625; G06F 2201/805
USPC ........................................ 714/6.21
See application file for complete search history.

(56) References Cited

U.S. PATENT DOCUMENTS 8,239,615 B2  8/2012  Mitsunaga et al.
8,924,636 B2  12/2014  Hirao et al.
(Continued)

OTHER PUBLICATIONS

Wikipedia "CPU Cache" page from date Jun. 17, 2017, retrieved using the WayBackMachine from https://web.archive.org/web/20170617035907/https://en.wikipedia.org/wiki/CPU_cache#Cache_entry_structure (Year: 2017).*

*Primary Examiner* — Yair Leibovich
(74) *Attorney, Agent, or Firm* — IP & T Group LLP

(57) ABSTRACT

Provided herein may be a memory system and a method of operating the same. The memory system may include a memory controller, and a plurality of memory devices coupled to the memory controller through a channel. Each of the memory devices may include a plurality of memory blocks, including a first memory block, the plurality of memory devices may constitute different ways, respectively, and a group of the first memory blocks respectively included in the plurality of memory devices may constitute a first super block. When any one of the first memory blocks included in the first super block is determined to be a bad block, the memory controller may be configured to generate a new second super block by replacing the first memory block determined to be the bad block with a second memory block.

16 Claims, 13 Drawing Sheets

(51) Int. Cl.
*G06F 11/16* (2006.01)
*G06F 3/06* (2006.01)
*G06F 11/10* (2006.01)

(56) References Cited

U.S. PATENT DOCUMENTS

| | | | |
|---|---|---|---|
| 2008/0052446 A1* | 2/2008 | Lasser | G06F 12/0246 |
| | | | 711/103 |
| 2012/0030409 A1* | 2/2012 | Post | G06F 12/0246 |
| | | | 711/103 |
| 2013/0073789 A1* | 3/2013 | Khmelnitsky | G06F 12/0246 |
| | | | 711/103 |
| 2014/0156966 A1* | 6/2014 | Ellis | G06F 3/0613 |
| | | | 711/173 |
| 2015/0339070 A1* | 11/2015 | Lee | G06F 3/0619 |
| | | | 711/103 |
| 2018/0151251 A1* | 5/2018 | Oh | G06F 3/0619 |
| 2018/0366210 A1* | 12/2018 | Park | G11C 29/82 |
| 2020/0117559 A1* | 4/2020 | Park | G06F 12/0607 |

\* cited by examiner

MEMORY SYSTEM AND METHOD OF OPERATING THE SAME

CROSS-REFERENCE TO RELATED APPLICATION

The present application claims priority under 35 U.S.C. § 119(a) to Korean Patent Application No. 10-2017-0079942, filed on Jun. 23, 2017, which is incorporated herein by reference in its entirety.

BACKGROUND

1. Field of Invention

Various exemplary embodiments of the present disclosure generally relate to a memory system and a method operating the memory system. Particularly, exemplary embodiments relate to a memory system, which replaces a bad block with a normal memory block when the bad block exists and then generates a new super block, and a method of operating the memory system.

2. Description of Related Art

A memory device may include a plurality of memory blocks. Further, each memory block may include a plurality of memory cells, and an erase operation may be simultaneously performed on memory cells included in one memory block. During the use of the memory device, a program failure or a read failure may occur in some of the plurality of memory blocks. Each memory block in which a program failure or read failure has occurred may be treated as a bad block and may not be subsequently reused. As the usage time of the memory device increases, the number of bad blocks may increase. If a number of bad blocks exceed a predetermined level, the memory device may be exhausted and may fail.

A memory system may include a plurality of memory devices. Further, the memory system may divide a plurality of memory blocks included in the plurality of memory devices into a plurality of super blocks, each having two or more memory blocks. An operation based on each super block enables the memory system to more efficiently manage a plurality of memory blocks.

SUMMARY

Various embodiments of the present disclosure are directed to a memory system, which can increase the lifespan thereof, and a method of operating the memory system.

An embodiment of the present disclosure may provide for a memory system. The memory system may include a memory controller; and a plurality of memory devices coupled to the memory controller through a channel. Each of the memory devices may include a plurality of memory blocks, including a first memory block, the plurality of memory devices may constitute different ways, respectively, and a group of the first memory blocks respectively included in the plurality of memory devices may constitute a first super block. When any one of the first memory blocks included in the first super block is determined to be a bad block, the memory controller may be configured to generate a new second super block by replacing the first memory block determined to be the bad block with a second memory block.

An embodiment of the present disclosure may provide for a memory system. The memory system may include a memory controller including a bad block management unit and a plurality of channel interfaces; a plurality of channels; and first and second super blocks. Each of the plurality of channel interfaces may correspond to any one of the plurality of channels, each of the plurality of channels may be coupled to a plurality of memory devices that constitute different ways, respectively, each of the plurality of memory devices may include a plurality of memory blocks, and each of the first and second super blocks may include memory blocks included in the different ways, among the plurality of memory blocks. When one or more memory blocks included in the first super block and one or more memory blocks included in the second super block are determined to be bad blocks, the bad block management unit may be configured to generate a new super block using normal memory blocks that are included in the first super block and the second super block.

An embodiment of the present disclosure may provide for a memory system. The memory system may include a plurality of super memory blocks each including a plurality of memory blocks of different memory devices; and a controller configured to detect at least one bad memory block in one of the super memory blocks, and construct a super memory block by replacing the bad memory block with a normal memory block, wherein the bad memory block and the normal memory block are included in the same memory device.

An embodiment of the present disclosure may provide for a method of operating a memory system. The method may include judging whether a first memory block included in a first super block is a bad block; storing an address of the first memory block in a bad block address table based on a result of the judging; checking, based on the bad block address table, whether it is possible to generate a new super block; and generating a second super block by replacing the first memory block with a second memory block based on a result of the checking, wherein a plurality of memory blocks included in the second super block may constitute different ways, respectively.

DETAILED DESCRIPTION

Figure 1:
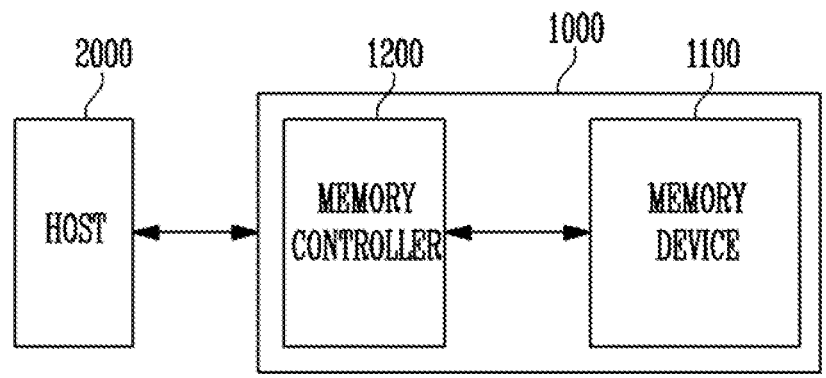
FIG. 1 is a diagram illustrating a memory system according to an embodiment of the present disclosure.

Various embodiments of the present invention are described below in more detail with reference to the accompanying drawings. We note, however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The drawings are not necessarily to scale and, in some instances, proportions may have been exaggerated in order to clearly illustrate features of the embodiments.

The terminology used herein is for the purpose of describing particular embodiments only and is not intended to be limiting of the present invention.

As used herein, singular forms may include the plural forms as well, unless the context clearly indicates otherwise.

It will be understood that when an element is referred to as being "coupled" or "connected" to a certain element, it may be directly coupled or connected to the certain element or may be indirectly coupled or connected to the certain element, with intervening elements being present therebetween. In the specification, when an element is referred to as "comprising" or "including" a component, it does not exclude other components but may further include other components unless a description to the contrary is specifically pointed out in context.

Hereinafter, the various embodiments of the present invention will be described in detail with reference to the attached drawings.

FIG. 1 is a diagram illustrating a memory system 1000 according to an embodiment of the present disclosure.

Referring to FIG. 1, the memory system 1000 may include a memory device (MD) 1100 for storing data and a memory controller 1200 for controlling the memory device 1100 under the control of a host 2000.

The host 2000 may communicate with the memory system 1000 using an interface protocol such as, but not limited to, a peripheral component interconnect-express (PCI-E), an advanced technology attachment (ATA), a serial ATA (SATA), a parallel ATA (PATA), or a serial attached SCSI (SAS). In addition, the interface protocol provided for the purpose of data communication between the host 2000 and the memory system 1000 is not limited to the above examples and may be an interface protocol such as a Universal Serial Bus (USB), a Multi-Media Card (MMC), an Enhanced Small Disk Interface (ESDI), or Integrated Drive Electronics (IDE).

The memory controller 1200 may control overall operations of the memory system 1000 and may control data exchange between the host 2000 and the memory device 1100. For example, the memory controller 1200 may program or read data by controlling the memory device 1100 in response to a request from the host 2000. Further, the memory controller 1200 may store information of main memory blocks and sub-memory blocks included in the memory device 1100, and may select the memory device 1100 so that a program operation is performed on a main memory block or a sub-memory block depending on the amount of data that is loaded for the program operation. In an embodiment, examples of the memory device 1110 may include a double data rate synchronous dynamic random access memory (DDR SDRAM), a low power double data rate 4 (LPDDR4) SDRAM, a graphics double data rate SDRAM (GDDR SDRAM), a low power DDR (LPDDR) SDRAM, a Rambus dynamic random access memory (RDRAM), or a flash memory.

The memory device 1100 may perform a program operation, a read operation, or an erase operation under the control of the memory controller 1200.

Figure 2:
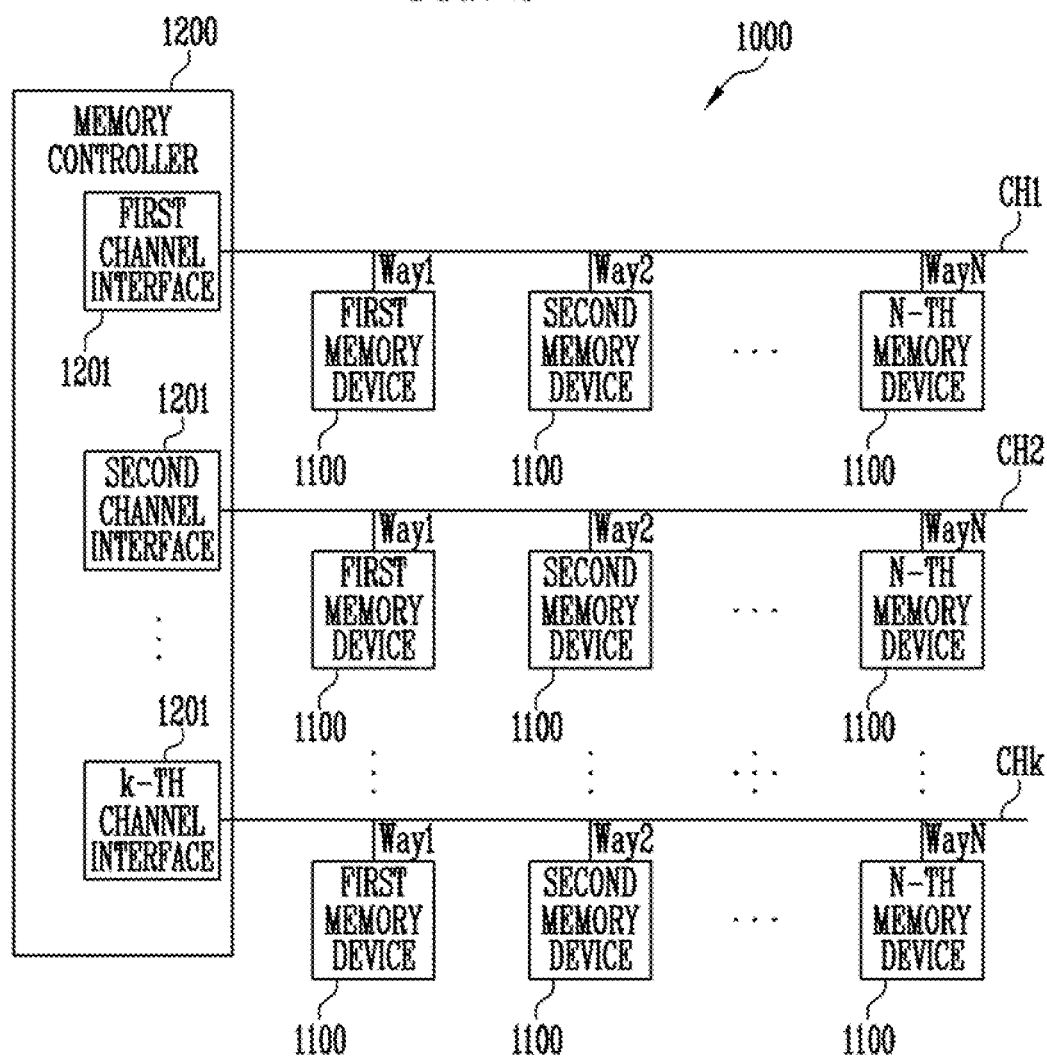
FIG. 2 is a diagram illustrating a memory system according to an embodiment of the present disclosure.

FIG. 2 is a diagram illustrating a memory system 1000 according to an embodiment of the present disclosure. The memory system 1000 may include a memory controller 1200 and a plurality of memory devices 1100 coupled to the memory controller 1200 through a plurality of channels CH1 to CHk.

Referring to FIG. 2, the memory controller 1200 may communicate with the plurality of memory devices 1100 through the plurality of channels CH1 to CHk. The memory controller 1200 may include a plurality of channel interfaces 1201, wherein each of the channels CH1 to CHk may be coupled to any one of the channel interfaces 1201. For example, the first channel CH1 may be coupled to the first channel interface 1201, the second channel CH2 may be coupled to the second channel interface 1201, and the k-th channel CHk may be coupled to the k-th channel interface 1201. Each of the channels CH1 to CHk may be coupled to one or more memory devices 1100. Further, the memory devices 1100 coupled to different channels may be operated independently of each other. In other words, the memory device 1100 coupled to the first channel CH1 and the memory device 1100 coupled to the second channel CH2 may be operated independently of each other. For example, the memory controller 1200 may exchange data or commands with the memory device 1100 coupled to the second channel CH2 through the second channel CH2 in parallel to the first channel CH1, while exchanging data or commands with the memory device 1100 coupled to the first channel CH1 through the first channel CH1.

Each of the plurality of channels CH1 to CHk may be coupled to a plurality of memory devices 1100. Here, a plurality of memory devices 1100 coupled to a single channel may constitute different ways, respectively. In an embodiment, N memory devices 1100 may be coupled to a single channel, and respective memory devices 1100 may configure different ways. For example, the first to N-th memory devices 1100 may be coupled to the first channel CH1, wherein the first memory device 1100 may configure a first way Way1, the second memory device 1100 may configure a second way Way2, and the N-th memory device 1100 may configure an N-th way WayN. Further, unlike the configuration of FIG. 2, two or more memory devices 1100 may constitute a single way.

Since the first to N-th memory devices 1100 coupled to the first channel CH1 share the channel, they may exchange data or commands with the memory controller 1200 sequentially, but not simultaneously. In other words, while the memory controller 1200 is transmitting data to the first memory device 1100 configuring the first way Way1 of the first channel CH1 through the first channel CH, the second to N-th memory devices 1100 configuring the second to N-th ways Way2 to WayN of the first channel CH1 cannot exchange data or commands with the memory controller 1200 through the first channel CH1. That is, while any one of the first to N-th memory devices 1100 sharing the first channel CH1 occupies the first channel CH1, other memory devices 1100 coupled to the first channel CH1 cannot use the first channel CH1.

The first memory device 1100 configuring the first way Way1 of the first channel CH1 and the first memory device 1100 configuring the first way Way1 of the second channel CH2 may communicate with the memory controller 1200, independently of each other. In other words, the memory controller 1200 may exchange data with the first memory device 1100 configuring the first way Way1 of the second channel CH2 through the second channel CH2 and the second channel interface 1201, while the memory controller 1200 exchanges data with the first memory device 1100 configuring the first way Way1 of the first channel CH1 through the first channel CH1 and the first channel interface 1201.

Figure 3:
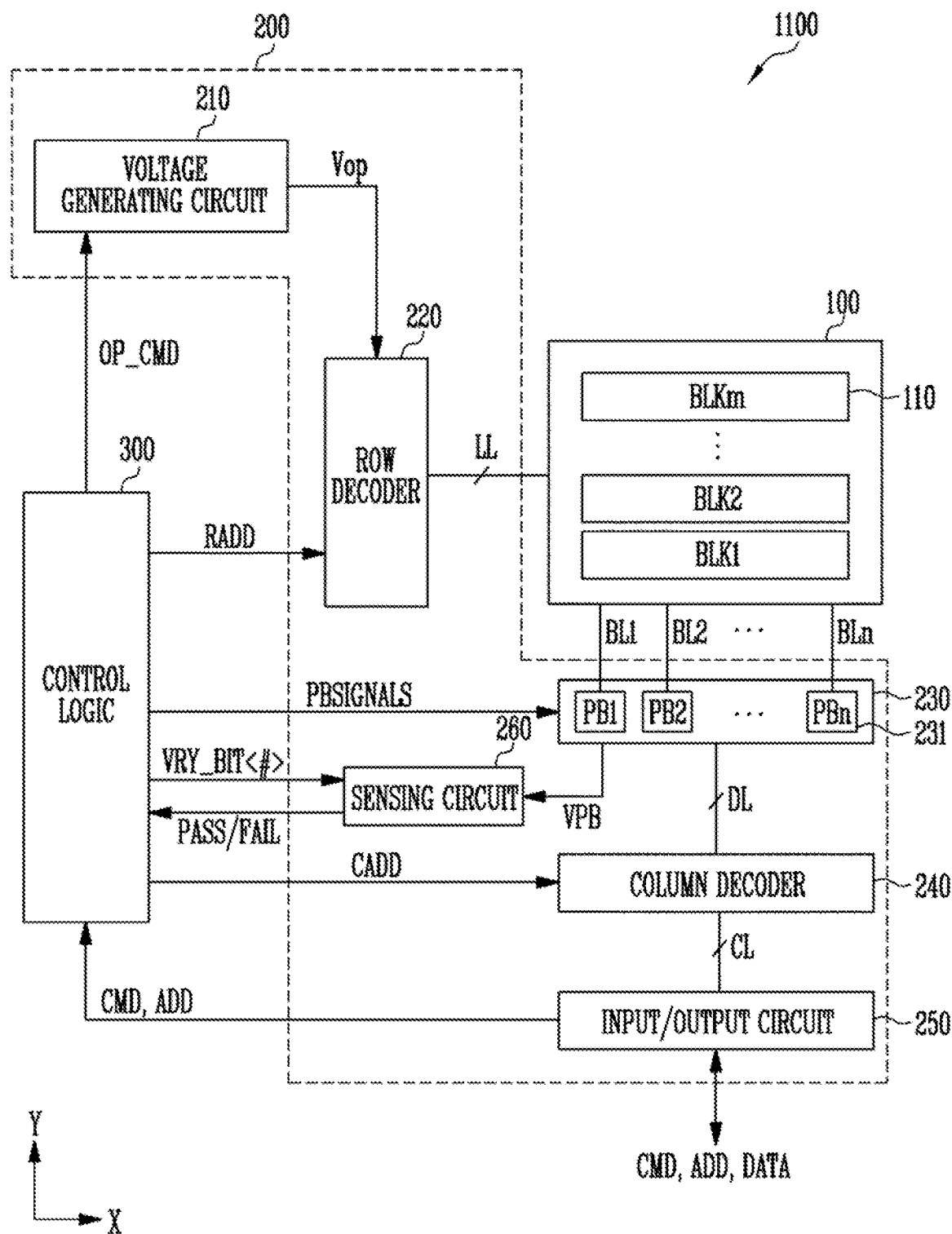
FIG. 3 is a diagram illustrating a memory device.

FIG. 3 is a diagram illustrating a memory device according to an embodiment of the present disclosure. The memory device may be, for example, the memory device 1100 of FIGS. 1 and 2.

Referring to FIG. 3, the memory device 1100 may include a memory cell array 100 in which data is stored. The memory device 1100 may also include peripheral circuits 200, which perform a program operation for storing data in the memory cell array 100, a read operation for outputting stored data, and an erase operation for erasing stored data. The memory device 1100 may include a control logic 300, which controls the peripheral circuits 200 under the control of a memory controller (e.g., 1200 of FIG. 1).

The memory cell array 100 may include a plurality of memory blocks BLK1 to BLKm 110 (where m is a positive integer). Local lines LL and bit lines BL1 to BLn (where n is a positive integer) may be coupled to each of the memory blocks BLK1 to BLKm 110. For example, the local lines LL may include a first select line, a second select line, and a plurality of word lines arranged between the first and second select lines. Further, the local lines LL may include dummy lines arranged between the first select line and the word lines and between the second select line and the word lines. Here, the first select line may be a source select line, and the second select line may be a drain select line. For example, the local lines LL may include word lines, drain and source select lines, and source lines. For example, the local lines LL may further include dummy lines. For example, the local lines LL may further include pipelines. The local lines LL may be coupled to the memory blocks BLK1 to BLKm 110, respectively, and the bit lines BL1 to BLn may be coupled in common to the memory blocks BLK1 to BLKm 110. The memory blocks BLK1 to BLKm 110 may be implemented as a two-dimensional (2D) or a three-dimensional (3D) structure. For example, the memory cells in the memory blocks 110 having a 2D structure may be arranged horizontally on a substrate. For example, memory cells in the memory blocks 110 having a 3D structure may be stacked vertically on the substrate.

The peripheral circuits 200 may perform a program, read, or erase operation on a selected memory block 110 under the control of the control logic 300. For example, under the control of the control logic 300, the peripheral circuits 200 may supply a verify and pass voltages to the first select line, the second select line, and the word lines, may selectively discharge the first select line, the second select line, and the word lines, and may verify memory cells coupled to a word line selected from among the word lines. An exemplary embodiment of the peripheral circuits 200 may include a voltage generating circuit 210, a row decoder 220, a page buffer group 230, a column decoder 240, an input/output circuit 250, and a sensing circuit 260.

The voltage generating circuit 210 may generate various operating voltages Vop used for program, read, and erase operations in response to an operation signal OP_CMD. Further, the voltage generating circuit 210 may selectively discharge the local lines LL in response to the operation signal OP_CMD. For example, under the control of the control logic 300, the voltage generating circuit 210 may generate a program voltage, a verify voltage, pass voltages, a turn-on voltage, a read voltage, an erase voltage, a source line voltage, etc.

The row decoder 220 may transfer the operating voltages Vop to the local lines LL coupled to a selected memory block 110 in response to a row address RADD.

The page buffer group 230 may include a plurality of page buffers PB1 to PBn coupled to the bit lines BL1 to BLn, respectively. The page buffers PB1 to PBn may be operated in response to page buffer control signals PBSIGNALS. For example, the page buffers PB1 to PBn may temporarily store data received through the bit lines BL1 to BLn or may sense the voltages or currents of the bit lines BL1 to BLn during a read or a verify operation.

The column decoder 240 may transfer data between the input/output circuit 250 and the page buffer group 230 in response to a column address CADD. For example, the column decoder 240 may exchange data with the page buffers 231 through data lines DL or may exchange data with the input/output circuit 250 through column lines CL.

The input/output circuit 250 may transfer a command CMD and an address ADD received from the memory controller (not illustrated) to the control logic 300, or may exchange data DATA with the column decoder 240.

The sensing circuit 260 may generate a reference current in response to an enable bit VRY_BIT<#> and may output a pass signal PASS or a fall signal FAIL by comparing a sensing voltage VPB, received from the page buffer group 230, to a reference voltage, generated based on the reference current, during the read operation or the verify operation.

The control logic 300 may control the peripheral circuits 200 by outputting the operation signal OP_CMD, the row address RADD, the column address CADD, the page buffer control signals PBSIGNALS, and the enable bit VRY_BIT<#> in response to the command CMD and the address ADD. Further, the control logic 300 may determine whether a verify operation has passed or failed in response to the pass or fall signal PASS or FAIL.

In the operation of the memory device 1100, each memory block 110 may be the unit of an erase operation. In other words, a plurality of memory cells included in a single memory block 110 may be simultaneously erased, but may not be selectively erased.

Figure 4:
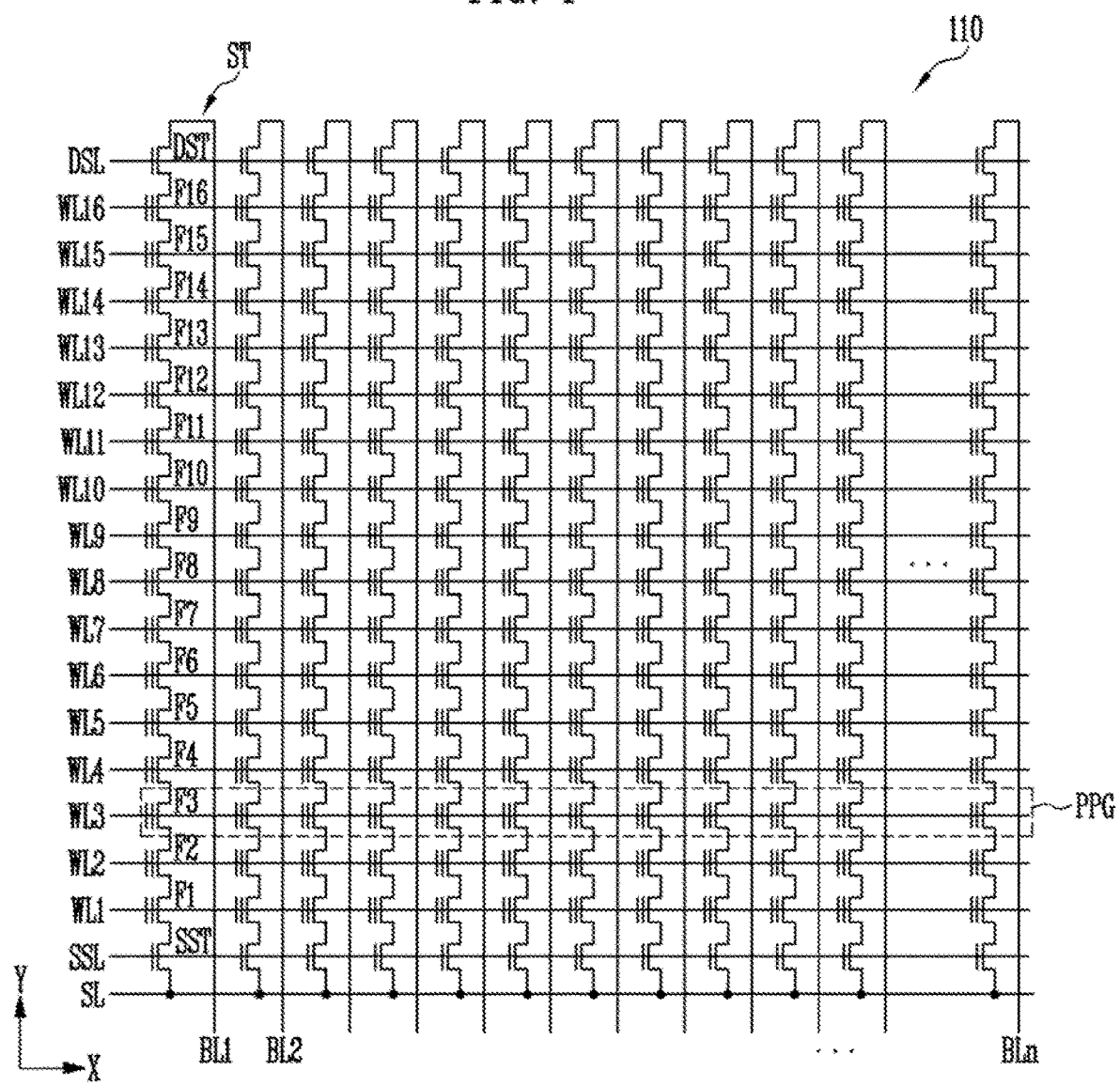
FIG. 4 is a diagram illustrating a memory block of FIG. 3.

FIG. 4 is a diagram illustrating the memory block 110 of FIG. 3.

Referring to FIG. 4, the memory block 110 may be configured such that a plurality of word lines, which are arranged in parallel, are coupled between a first select line and a second select line. Here, the first select line may be a source select line SSL and the second select line may be a drain select line DSL. In detail, the memory block 110 may include a plurality of strings ST coupled between bit lines BL1 to BLn and a source line SL. The bit lines BL1 to BLn may be coupled to the strings ST, respectively, and the source line may be coupled in common to the strings ST. Since the strings ST may have the same configuration, only a string ST coupled to the first bit line BL1 will be described in detail for the sake of convenience in description and brevity.

The string ST may include a source select transistor SST, a plurality of memory cells F1 to F16, and a drain select transistor DST, which are connected in series between the source line SL and the first bit line BL1. A single string ST may include one or more source select transistors SST and drain select transistors DST, and may include more memory cells than the memory cells F1 to F16 illustrated in the drawing.

A source of the source select transistor SST may be coupled to the source line SL and a drain of the drain select transistor DST may be coupled to the first bit line BL1. The memory cells F1 to F16 may be connected in series between the source select transistor SST and the drain select transistor DST. Gates of the source select transistors SST included in different strings ST may be coupled to a source select line SSL, gates of the drain select transistors DST may be coupled to a drain select line DSL, and gates of the memory cells F1 to F16 may be coupled to a plurality of word lines WL1 to WL16. A group of memory cells coupled to the same word line, among the memory cells included in different strings ST, may be referred to as a physical page PPG. Therefore, a number of physical pages PPG that are identical to the number of word lines WL1 to WL16 may be included in the memory block 110.

A single memory cell may store one bit of data. This cell is referred to as a single-level cell SLC. In this case, a single physical page PPG may store data corresponding to a single logical page LPG. Data corresponding to a single logical page LPG may include a number of data bits identical to the number of cells included in a single physical page PPG. Further, a single memory cell MC may store two or more bits of data. This cell is typically referred to as a multi-level cell MLC. In this case a single physical page PPG may store data corresponding to two or more logical pages LPG.

A plurality of memory cells included in a single physical page PPG may be simultaneously programmed. In other words, the memory device 1100 may perform a program operation on each physical page PPG. A plurality of memory cells included in a single memory block may be simultaneously erased. That is, the memory device 1100 may perform an erase operation on each memory block 110. For example, in order to update a portion of data stored in a single memory block 110, entire data stored in the memory block 110 may be read, and a portion of the entire data that is to be updated may be changed, and thereafter the entire data may be programmed in another memory block 110. The reason for this is that, when the memory block 110 is the unit of an erase operation in the operation of the memory device 1100, it may be impossible to erase only a portion of the data stored in the memory block 110 and to program new data in the memory block 110. This characteristic of the memory device may be one of factors that complicate a garbage collection operation. Further, when error occurs in some of the memory cells included in the memory block 110 due to degradation during the use of the memory cells, the corresponding memory block 110 may be treated as a bad block and may be managed such that all memory cells included in the bad block are not used.

Figure 5:
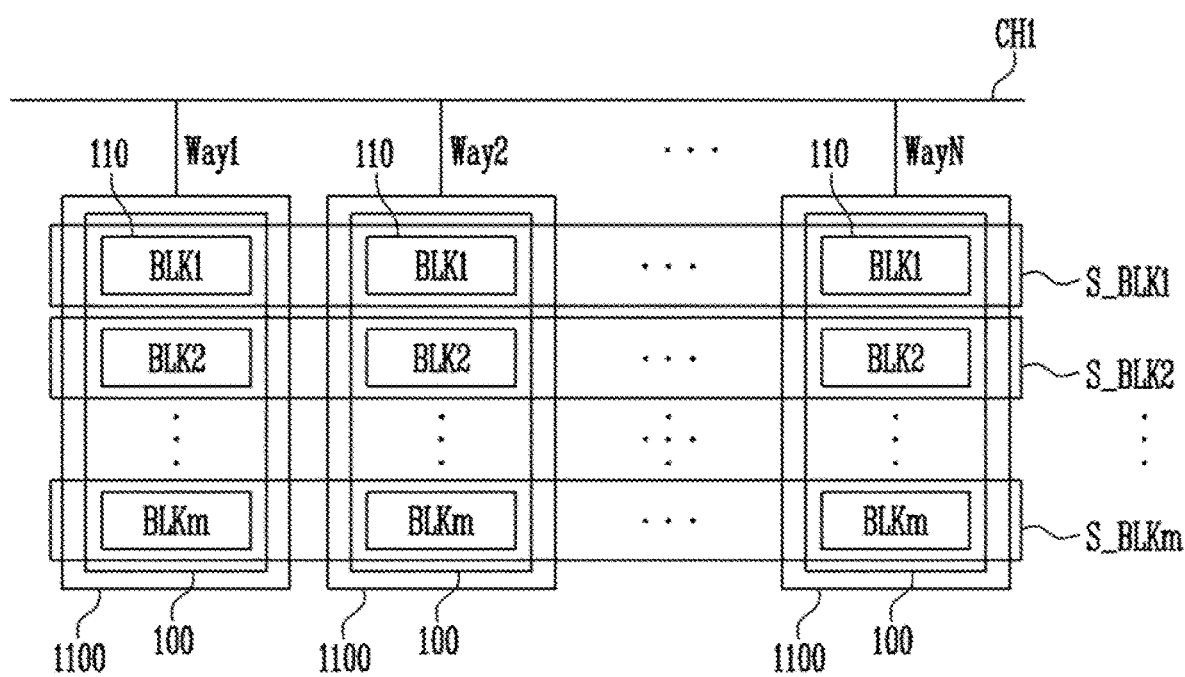
FIG. 5 is a diagram illustrating super blocks according to an embodiment of the present disclosure.

FIG. 5 is a diagram illustrating super blocks S_BLK1 to S_BLKm according to an embodiment of the present disclosure.

Referring to FIG. 5, each of a plurality of ways Way1 to WayN constituting a first channel CH1 may include one or more memory devices 1100. As described above, a single memory device 1100 may include a plurality of memory blocks BLK1 to BLKm 110. An erase operation may be performed on individual memory blocks BLK1 to BLKm 110 independently of each other, and the erase operation may be simultaneously performed on a plurality of memory cells included in a single memory block 110.

Each super block S_BLK1 to S_BLKm may include a set of memory blocks selected from among respective memory devices 1100 configuring different ways. In other words, a first super block S_BLK1 may be constituted using first memory blocks BLK1 110 included in a first memory device MD1 1100 configuring the first way Way1 to an N-th memory device MDN 1100 configuring the N-th way WayN. Further, a second super block S_BLK2 may be constituted using second memory blocks BLK2 110 included in the first memory device MD1 1100 to the N-th memory device MDN. Similarly, an m-th super block S_BLKm may be constituted using m-th memory blocks BLKm 110 included in the first memory device MD1 1100 the N-th memory device MDN 1100.

A plurality of memory blocks included in a single super block are physically different memory blocks, but may logically function as a single memory block. In other words, the plurality of memory blocks included in a single super block may be simultaneously programmed or erased. The memory system 1000 may perform a program or an erase operation on each super block, thus improving the performance of the program or erase operation. Further, the memory system 1000 may perform an operation, such as garbage collection or wear leveling, on each super block, improving the efficiency of the plurality of memory blocks.

Figure 6:
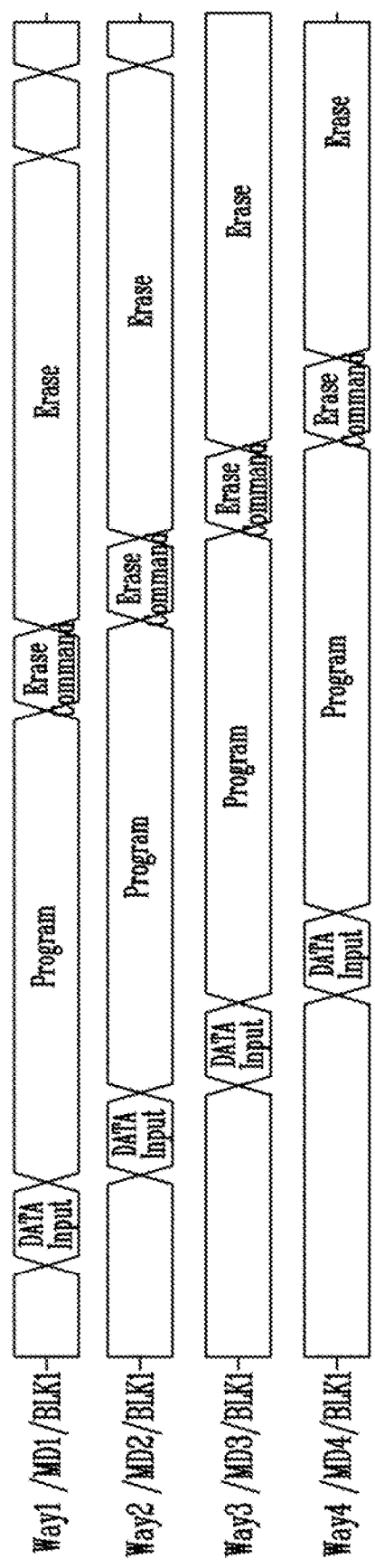
FIG. 6 is a diagram illustrating a method of operating a super block.

FIG. 6 is a diagram illustrating a method of operating a super block. The super block may be, for example, the super blocks S_BLK1 to S_BLKm described in FIG. 5.

FIG. 6 is a diagram for explaining the operation of a plurality of memory blocks 110 constituting a single super block, and exemplarily illustrates four ways Way1 to Way4 constituting a first channel CH1 and the operation of memory devices MD1 to MD4 configuring respective ways. The first memory device MD1 1100 configures the first way Way1, the second memory device MD2 1100 configures the second way Way2, the third memory device MD3 configures the third way Way3, and the fourth memory device MD4 1100 configures the fourth way Way4. Further, first memory blocks BLK1 110 respectively included in the first to fourth memory devices MD1 to MD4 1100 constitute the first super block S_BLK1.

As described above, a plurality of ways constituting a single channel cannot simultaneously occupy the channel. In other words, when any one of the plurality of ways constituting the single channel occupies the channel, the remaining ways should wait for the occupation of the channel to stop. Therefore, as illustrated in FIG. 6, when performing a program operation on the first super block S_BLK1, the memory controller 1200 may input program data to the first memory device MD1 1100, which configures the first way Way1, through the first channel CH1. After terminating the operation of inputting the program data to the first memory device MD1 1100, that is, after terminating the occupation of the first channel CH1 by the first memory device MD1 1100, the memory controller 1200 may input program data to the second memory device MD2 1100 through the first channel CH1. In other words, the memory controller 1200 may sequentially input program data, through the first channel CH1, to the first to fourth memory devices MD1 to MD4 1100, which configure the first to fourth ways Way1 to Way4, respectively.

As described above, after receiving the program data, respective memory devices 1100 coupled to the first channel CH1 may perform program operations in parallel on the first memory blocks BLK1 110 included in the first super block S_BLK1. Consequently, as illustrated in FIG. 6, program operations may be performed simultaneously to the memory blocks constituting a single super block. In other words, a plurality of memory blocks including a single super block may logically function as a single memory block.

When performing an erase operation on the first super block S_BLK1, the memory controller 1200 may input an erase command to the first memory device MD1 1100, which configures the first way Way1, through the first channel CH1. After terminating the operation of inputting the erase command to the first memory device MD1 1100, that is, after terminating the occupation of the first channel CH1 by the first memory device MD1 1100, the memory controller 1200 may input an erase command to the second memory device MD2 1100. In other words, the memory controller 1200 may sequentially input the erase command, through the first channel CH1, to the first to fourth memory devices MD1 to MD4 1100, which configure the first to fourth ways Way1 to Way4, respectively.

As described above, after receiving the erase command, respective memory devices 1100 coupled to the first channel CH1 may perform erase operations in parallel on the first memory blocks BLK1 110 included in the first super block S_BLK1. Consequently, as illustrated in FIG. 6, simultaneous erase operations may be performed on the memory blocks constituting a single super block. In other words, a plurality of memory blocks included in a single super block may logically function as a single memory block. The memory system 1000 may manage each super block as a single memory block. From a physical standpoint, a memory block may be an erase unit, but, from an operation standpoint, a super block may function as an erase unit.

A plurality of memory blocks 110 constituting a single super block may not be simultaneously programmed. For example, the first memory block BLK1 110 included in the first memory device MD1 1100 configuring the first super block S_BLK1 and the first memory block BLK1 110 included in the second memory device MD2 1100 may be independently programmed.

A plurality of memory blocks constituting a single super block may be simultaneously erased. Typically, each memory block in the memory device 1100 including NAND flash memory cells may be an erase unit. The memory system 1000 may manage each super block as an erase unit. Through such super block management, the memory system 1000 may efficiently manage block addresses, thus more efficiently performing operations such as garbage collection operations and wear leveling operations.

Figure 7:
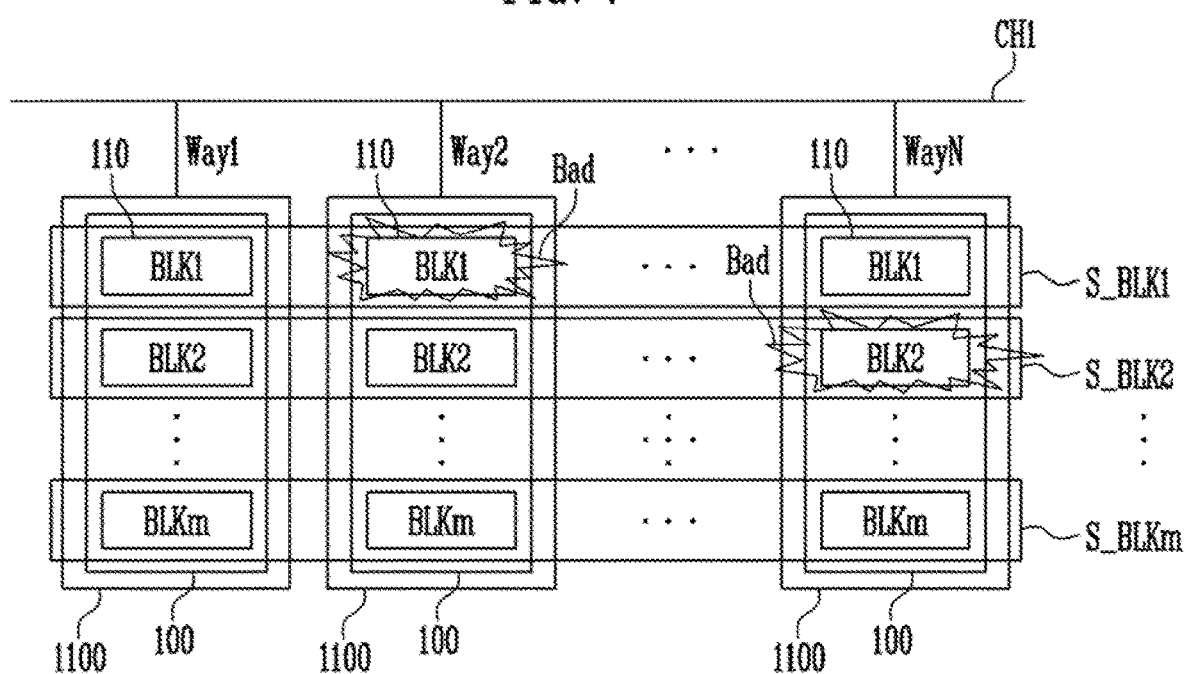
FIG. 7 is a diagram explaining bad blocks.

FIG. 7 is a diagram explaining bad blocks.

Referring to FIG. 7, a plurality of memory blocks 110 included in a memory system 1000 may be degraded due to the repetition of program and erase operations or the repetition of read operations. Further, a program or read operation may fail due to defects in a manufacturing process while a user is using the plurality of memory blocks 110. In this case, the memory blocks 110 may fail to store data or may lose the stored data, and thus separate management may be required.

For example, a program operation may be performed on a plurality of memory blocks 110 included in the first super block S_BLK1. Here, the first memory block BLK1 110 included in the second memory device MD2 1100, which configures the second way Way2, may fall in the program operation, and other memory blocks may pass the program operation.

In this case, a conventional memory system may treat the first super block S_BLK1 as a bad block. In other words, the conventional memory system may treat all memory blocks 110, included in the first super block S_BLK1, as bad blocks. The memory blocks 110 treated as bad blocks may not be subsequently reused any more. In this way, the conventional memory system, which performs the treatment of bad blocks on each super block, may also treat memory blocks 110 that are not actually bad as bad blocks, thus deteriorating the efficiency of use of storage space.

In a typical memory system, the number of bad blocks may increase as usage time increases, or as the number of program and erase operations or the number of read operations increases. Further, when a number of bad blocks exceeding a predetermined level occur in the memory system, the memory system may fail to store new data, and perform only an operation of reading the stored data. Therefore, efficient management of bad blocks may impact the lifespan of the memory system 1000. As described above, the conventional memory system, which performs the treatment of bad blocks on each super block, may also treat memory blocks 110 that are not actually bad as bad blocks, thus potentially shortening the lifespan of the memory system 1000.

Unlike the conventional memory system described above, the memory system 1000 according to an embodiment of the present disclosure may treat only a memory block 110, in which a program failure has actually occurred in the first super block S_BLK1, as a bad block, and may subsequently reuse the remaining memory blocks 110, in which a program failure has not occurred. That is, normal memory blocks 110 in which a program failure has not occurred and which are included in the first super block S_BLK1 may be used when a new super block is subsequently generated. Therefore, a method of managing bad blocks and generating new super blocks in accordance with the present disclosure may allow a memory system to reuse normal memory blocks that are included in a super block that includes a bad block, and may improve the efficiency of use of storage space, thus extending the lifespan of the memory system 1000.

For example, a program operation may be performed only on the first memory block BLK1 110 of the second memory device MD2 1100, which configures the second way Way2, among a plurality of memory blocks included in the first super block S_BLK1. Here, when a failure in the program operation has occurred, the first memory block BLK1 110 of the second memory device MD2 1100, which configures the second way Way2, in which the failure has actually occurred, may be treated as a bad block. Here, a probability that other memory blocks 110 included in the first super block S_BLK1 will be bad may not be high. The reason for this is that there are typically many cases where memory blocks 110 included in a single memory device 1100 will be subjected together to a program failure, but, among the different memory devices 1100, program failure characteristics may differ from each other. In other words, even if a program failure has occurred in any one of memory blocks constituting a single super block, a probability that a program failure will occur in the remaining memory blocks 110 constituting the corresponding super block may not be very high. Therefore, when a program failure has occurred in any one of the memory blocks 110 constituting a single super block, only the memory block 110 in which the program failure has actually occurred may be treated as a bad block, and the remaining memory blocks may be immediately used when a new super block is generated, without determination as to whether the remaining memory blocks are also bad blocks.

In another example, a read operation may be performed on a plurality of memory blocks 110 included in the second super block S_BLK2. Here, an m-th memory block BLKm 110 included in the N-th memory device MDN 1100, which configure the N-th way WayN, may fail in the read operation, and the remaining memory blocks may pass the read operation. In this case, the memory system 1000 may treat the m-th super block S_BLKm as a bad block. In other words, the memory system 1000 may treat all memory blocks 110, included in the m-th super block S_BLKm, as bad blocks. As described above, such a bad block management method may also treat memory blocks 110 that are not actually bad as bad blocks, thus decreasing the efficiency of use of storage space.

For example, a read operation may be performed only on the m-th memory block BLKm 110 of the N-th memory device MDN 1100, which configures the N-th way WayN, among a plurality of memory blocks 110 included in the m-th super block S_BLKm. Here, when a failure in the read operation has occurred, the m-th memory block BLKm 110 of the N-th memory device MDN 1100 that configures the N-th way WayN, in which the failure has actually occurred, may be treated as a bad block. Here, a probability that the remaining memory blocks 110 included in the m-th super block S_BLKm will also be bad may be high, because a plurality of memory blocks 110 included in a single super block may be programmed, erased, or read together. In other words, a plurality of memory blocks 110 included in a single super block may be degraded to a similar degree. Therefore, when a read failure occurs in any one of the plurality of memory blocks 110 constituting a single super block, the corresponding memory block 110 in which the read failure has actually occurred may be treated as a bad block. Thereafter, when a new super block is generated, the remaining memory blocks 110 may be separately checked as to whether a read failure has occurred, and may be utilized when the remaining memory blocks 110 are determined to be normal memory blocks 110.

Figure 8:
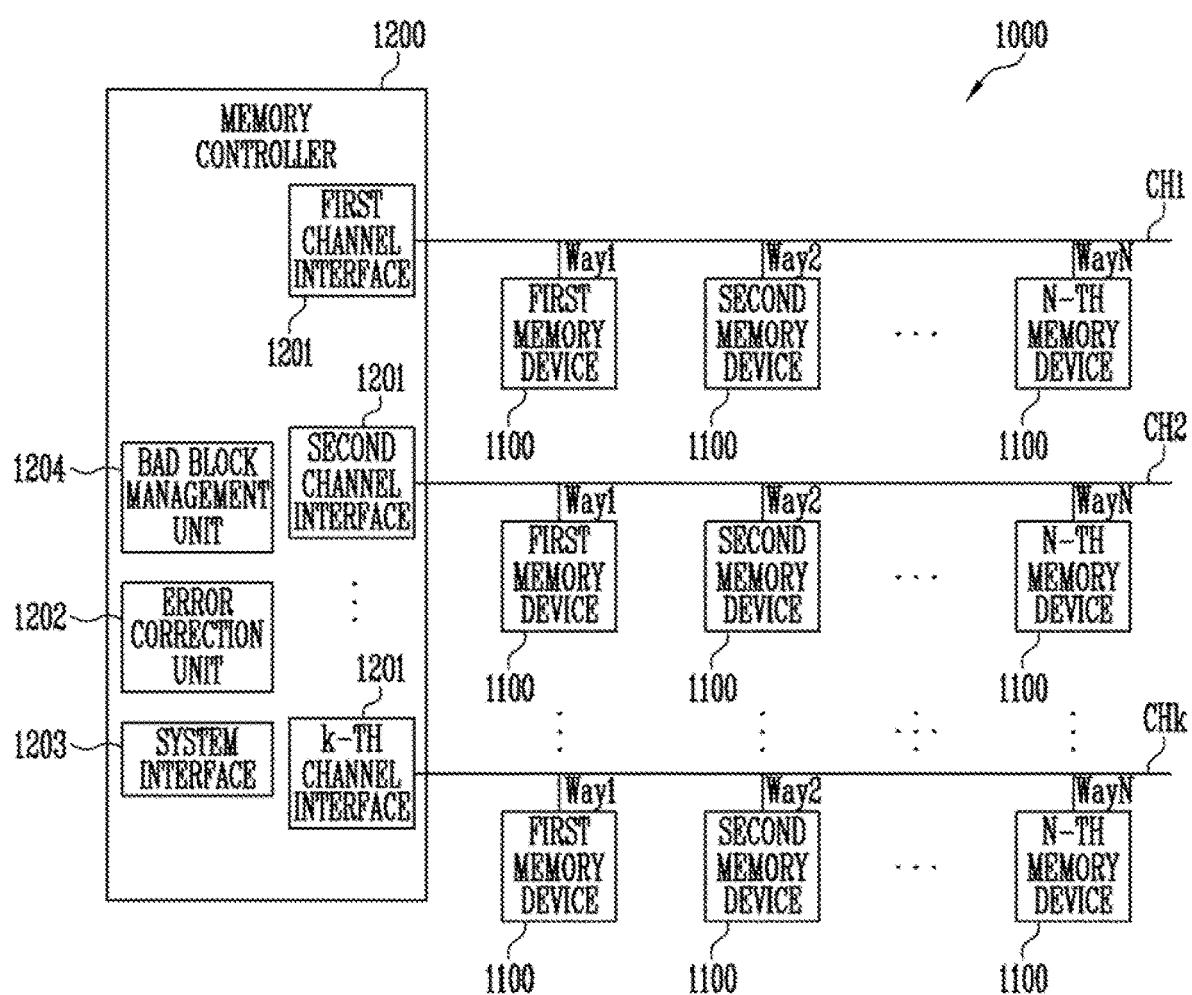
FIG. 8 is a diagram illustrating a memory system according to an embodiment of the present disclosure.

FIG. 8 is a diagram illustrating the memory system 1000 according to another embodiment of the present disclosure.

Referring to FIG. 8, the memory controller 1200 may further include one or more channel interfaces 1201, an error correction unit 1202, a system interface 1203, and a bad block management unit 1204.

The error correction unit 1202 may perform an error correction operation on data read from the memory device 1100 during a read operation. The memory cells included in the memory device 1100 may lose part of stored data due to degradation and, in this case, errors may be contained in the read data. The error correction unit 1202 may perform an operation of correcting the errors in the read data. If the degradation of a memory cell becomes serious, errors above a predetermined level may be contained in the read data, and may exceed an error level which can be corrected by the error correction unit 1202. In other words, the error correction unit 1202 may fail to correct the errors in the read data.

When the above-described error correction unit 1202 falls to correct the errors in the data read from the memory block 110, the bad block management unit 1204 may treat the corresponding memory block 110 as a bad block, and may store the address of the memory block 110 treated as a bad block. Further, when a program operation on a memory block 110 fails, the bad block management unit 1204 may treat the corresponding memory block 110 as a bad block and may store the address of the memory block 110 treated as a bad block. In other words, the bad block management unit 1204 may store the block address of the bad block. The bad block management unit 1204 may include a bad block address table, and may store the block address of each bad block in the bad block address table.

The bad block management unit 1204 may control an operation of generating a new super block. For example, when any one of a plurality of memory blocks 110 included in a first super block S_BLK1 is treated as a bad block, the bad block management unit 1204 may store the address of the memory block 110 treated as the bad block and may also store the address of the first super block S_BLK1. Thereafter, the bad block management unit 1204 may use normal memory blocks 110 included in the first super block S_BLK1 when a new super block is generated, and may replace the bad block with a new normal memory block 110 and use the new normal memory block 110.

In an embodiment, when any one of the plurality of memory blocks 110 included in the first super block S_BLK1 is treated as a bad block, and any one of a plurality of memory blocks 110 included in a second super block S_BLK2 is treated as a bad block, the bad block management unit 1204 may store the addresses of the bad block of the first super block S_BLK1 and the bad block of the second super block S_BLK2, and may also store the addresses of the first and second super blocks S_BLK1 and S_BLK2. Thereafter, the bad block management unit 1204 may use normal memory blocks 110 included in the first super block S_BLK1 and normal memory blocks 110 included in the second super block S_BLK2 when a new super block is generated.

In an embodiment, when any one of the plurality of memory blocks 110 included in the first super block S_BLK1 fails in an error correction operation and is treated as a bad block during the read operation, the bad block management unit 1204 may first store the address of the memory block 110 treated as the bad block and may also store the address of the first super block S_BLK1. Furthermore, the bad block management unit 1204 may store information indicating that the bad block has failed in the read operation. Thereafter, when a new super block is generated, the bad block management unit 1204 may read the remaining memory blocks 110 included in the first super block S_BLK1 and may determine whether the remaining memory blocks 110 are bad blocks. In addition, the bad block management unit 1204 may perform an operation of generating a new super block based on the result of the determination. In other words, the bad block management unit 1204 may generate a new super block using memory blocks determined to be normal memory blocks, based on whether the bad block management unit 1204 determines them to be bad blocks or normal blocks.

The system interface 1203 may receive a command from a host 2000. For example, the system interface 1203 may receive a power saving command from the host 2000. The power saving command is a command for operating the memory system 1000 so that the memory system 1000 consumes low power. In an embodiment, the power saving command may be a sleep command or a hibernation command. When the sleep command is inputted from the host 2000, the memory system 1000 supplies power to the system interface 1203 and the bad block management unit 1204, and stops the supply of power to other components, thus decreasing the entire power consumption of the memory system 1000. That is, when the sleep command is inputted from the host 2000, the memory system 1000 maintains the system interface 1203 and the bad block management unit 1204 in an operable state. Thereafter, when a wake-up command is inputted from the host 2000, the system interface 1203 allows the resumption of supply of power to the components, to which the supply of power was temporarily stopped, in response to the wave-up command, thus enabling the components to be operated.

The bad block management unit 1204 may perform the operation of generating a new super block in an idle state or in a power saving mode. When the memory system 100 enters the idle state, the bad block management unit 1204 may perform an operation of determining whether the remaining memory blocks, included in the super block including a bad block, are bad blocks in order to generate a new super block, and may generate a new super block based on the determination. Further, before or while the power saving mode is executed in response to a power saving command received from the host, the bad block management unit 1204 may stop the power saving mode for a predetermined period of time and may then perform the above-described new super block generation operation.

Figure 9:
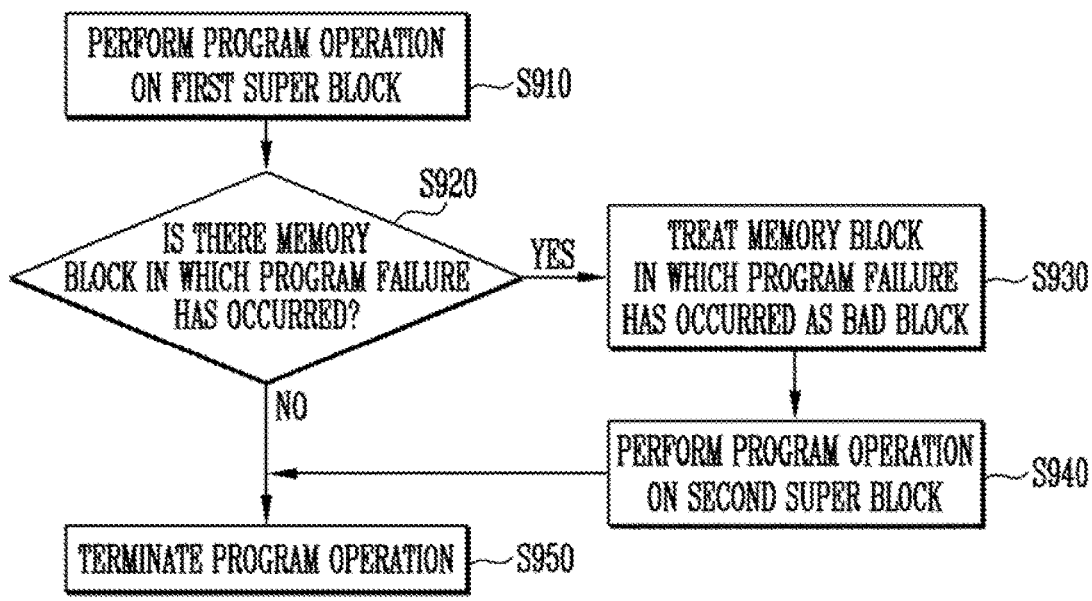
FIG. 9 is a flowchart describing a method of managing a bad block during a program operation.

FIG. 9 is a flowchart describing a method of managing a bad block during a program operation.

Referring to FIG. 9, at step S910, the memory system 1000 may perform a program operation on a first super block S_BLK1. Then, at step S920, whether there is a memory block 110 in which a program failure has occurred is checked. If there is no memory block 110 in which a program failure has occurred (that is, "NO" at step S920), and the program operation has been normally performed, the program operation may be terminated at step S950. However, if there is a memory block 110 in which a program failure has occurred (that is, "YES" at step S930), the memory block 110 having failed to be programmed may be treated as a bad block at step S930. Step S930 may include the step of storing the address of the memory block 110 having failed to be programmed. Further, step S930 may include the step of storing the address of the first super block S_BLK1 including the memory block 110 having failed to be programmed. Step S930 may be performed by the bad block management unit 1204 of FIG. 8. After step S930 has been performed, the memory system 1000 may perform an operation of programming data in a second super block S_BLK2 at step S940. In other words, when the program operation on the first super block S_BLK1 has failed, the operation of programming the corresponding data in the second super block S_BLK2 may be performed. Next, after the program operation has been normally performed on the second super block S_BLK2, the program operation terminates at step S950.

Figure 10:
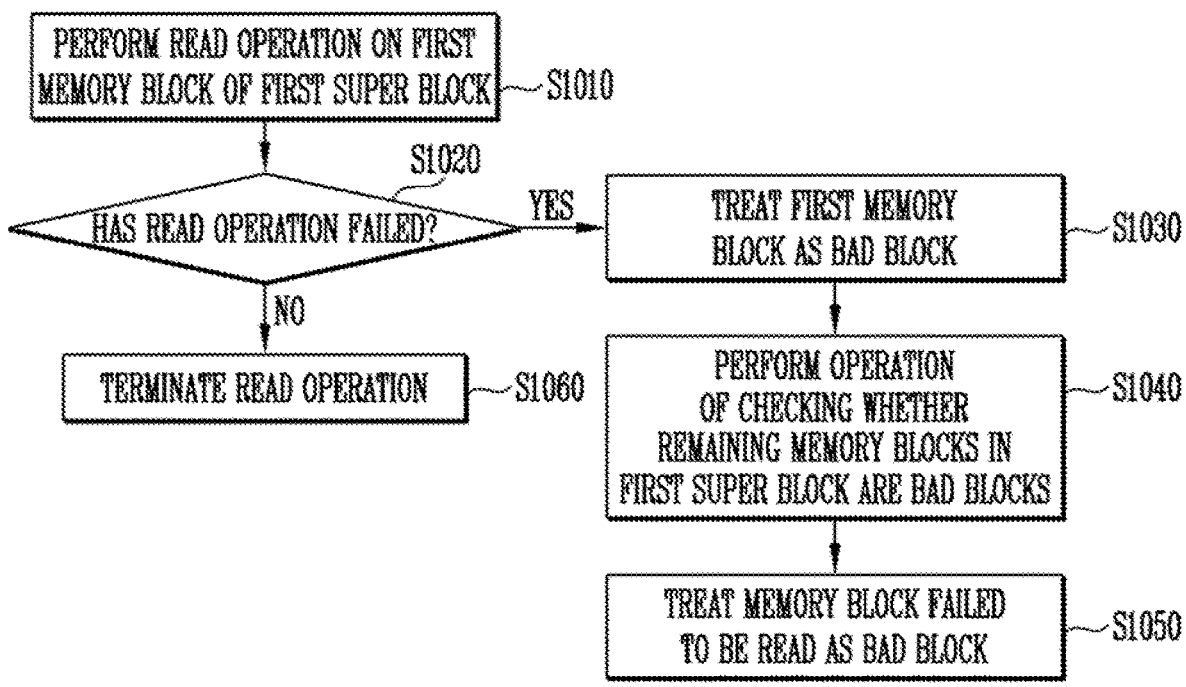
FIGS. 10 and 11 are flowcharts describing a method of managing a bad block during a read operation.
Figure 11:
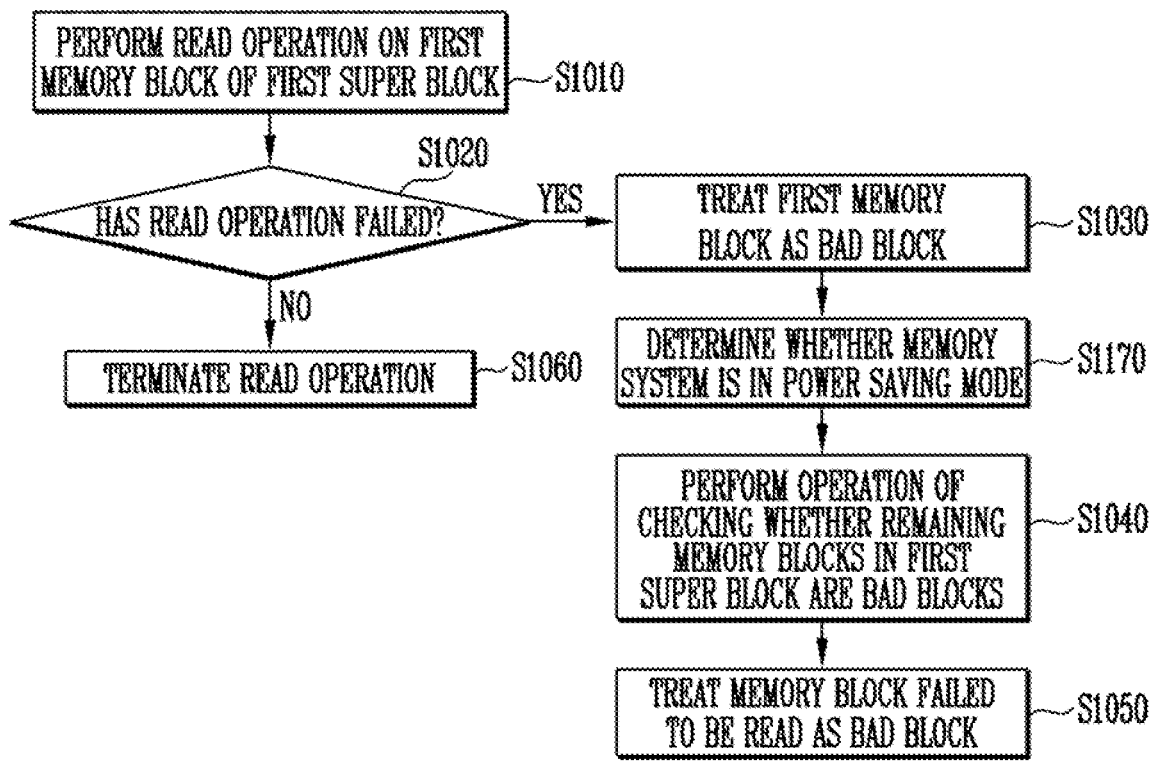

FIGS. 10 and 11 are flowcharts describing a method of managing a bad block during a read operation.

Referring to FIG. 10, at step S1010, the memory system 1000 may first perform a read operation on a first memory block BLK1 110. Then, at step S1020, whether the read operation has failed is determined. If the read operation has been normally performed (that is "NO" at step S1020), the read operation is terminated at step S1060. However, if the read operation has failed (that is, "YES" at step S1020), the first memory block BLK1 110 may be treated as a bad block at step S1030. Step S1030 may include the step of storing the address of the first memory block BLK1 110 having failed to be read. Further, step S1030 may include the step of storing the address of the first super block S_BLK1 that includes the first memory block BLK1 110 having failed to be read. Step S1030 may be performed by the bad block management unit 1204 of FIG. 8. After step S1030 has been performed, an operation of checking whether the remaining memory blocks 110 in the first super block S_BLK1 are bad blocks may be performed at step S1040. As a result, if there is a memory block 110 in which a read failure has occurred, the corresponding memory block 110 may be additionally treated as a bad block at step S1050. Step S1050 may also be performed by the bad block management unit 1204 of FIG. 8.

Referring to FIG. 11, the step S1170 of determining whether the memory system 1000 is in a power saving mode may be included before step S1040 is performed in the method in the flowchart of FIG. 10. In other words, the operation of determining whether the remaining memory blocks in the super block including the bad block, in which a read failure has occurred, are bad blocks may be performed in the power saving mode. The power saving mode may be initiated by the memory system 1000 receiving a power saving command from the host. Further, as described above, the power saving command may be a sleep command or a hibernation command. The memory system 1000 may temporarily stop the power saving mode and may then perform steps S1040 and S1050.

In another exemplary embodiment, step S1170 may be replaced with an operation of determining whether the memory system 1000 is in an idle state.

Figure 12:
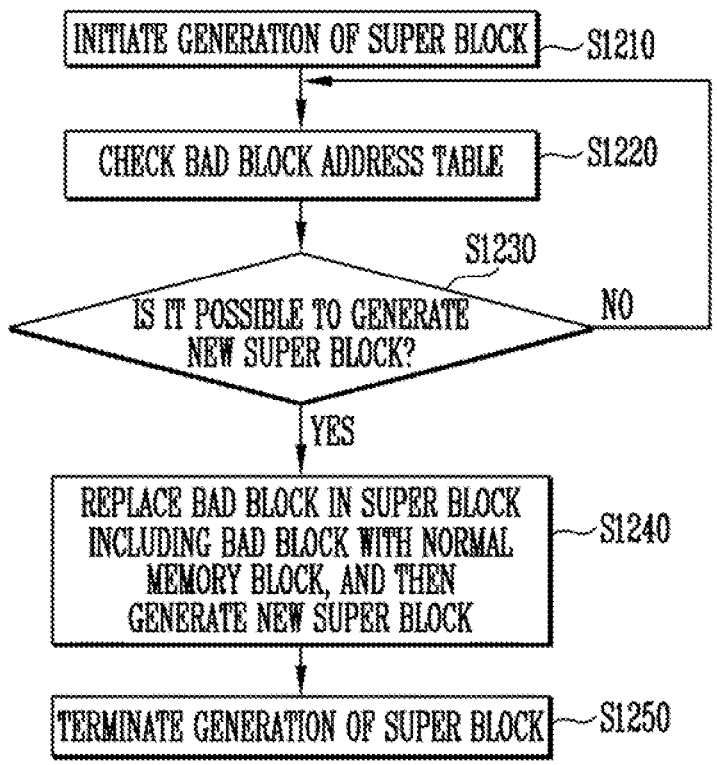
FIGS. 12 and 13 are diagrams describing a method of generating a new super block.
Figure 13:
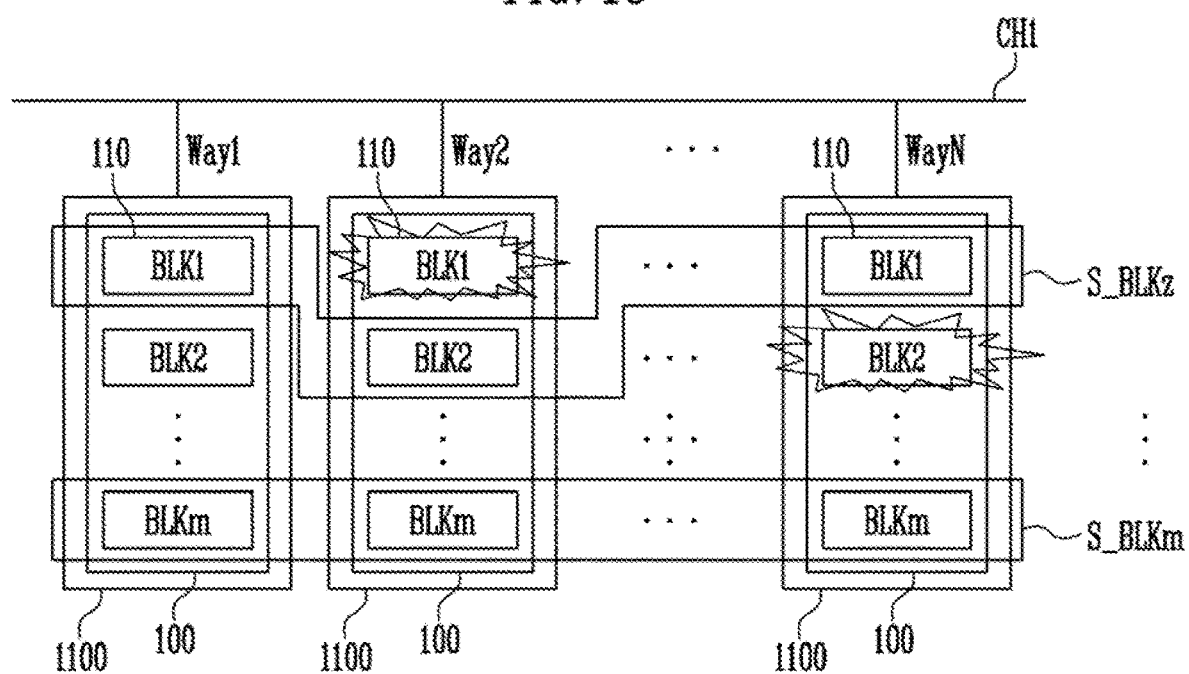

FIGS. 12 and 13 are diagrams describing a method of generating a new super block.

Referring to FIG. 12, at step S1210, the memory system 1000 may initiate a super block generation operation. When the super block generation operation is initiated, a bad block address table is checked at step S1220. As a result of checking the bad block address table, when it is possible to generate a new super block at step S1230 (that is, "YES" at step S1230), a bad block in the super block may be replaced with a normal memory block, and then the new super block may be generated at step S1240. Thereafter, the super block generation operation may be terminated at step S1250. The fact that, as a result of checking the bad block address table, the generation of a new super block is possible may mean that normal memory blocks to be used to generate a new super block have been acquired. The bad block address table stores the addresses of memory blocks treated as bad blocks, and may be managed by the bad block management unit 1204 of FIG. 8. Steps S1210 to S1250 of FIG. 12 may be performed by the bad block management unit 1204 of FIG. 8.

As a result of checking the bad block address table, when it is not possible to generate a new super block at step S1230 (that is, "No" at step S1230), the method goes back to step S1220.

FIG. 13 is a diagram describing a method of generating a new super block. Referring to FIG. 13, as described above with reference to FIG. 7, when the first memory block BLK1 110 of the second memory device MD2 1100 included in the first super block S_BLK1 and the first memory block BLK1 110 of the N-th memory device MDN 1100 included in the second super block S_BLK2 are treated as bad blocks, respectively, the first super block S_BLK1 and the second super block S_BLK2 may be dismantled and used to generate a new z-th super block S_BLKz. In other words, the first memory block BLK1 110 of the second memory device MD2 1100, originally included in the first super block S_BLK1, is replaced with the second memory block BLK2 110 of the second memory device MD2 1100 included in the second super block S_BLK2. The first memory block BLK1 110 of the N-th memory device MDN 1100, originally included in the second super block S_BLK2, is replaced with the first memory block BLK1 110 of the N-th memory device MDN 1100 included in the first super block S_BLK1. Thus, a z-th super block S_BLKz that is a new super block may be generated. This operation may be performed by the bad block management unit 1204 of FIG. 8.

A method of managing bad blocks and generating super blocks based on such a scheme may subsequently reuse normal memory blocks 110 that are included in each super block including a bad block, and may improve the efficiency of use of storage space, thus extending the lifespan of the memory system 1000.

Figure 14:
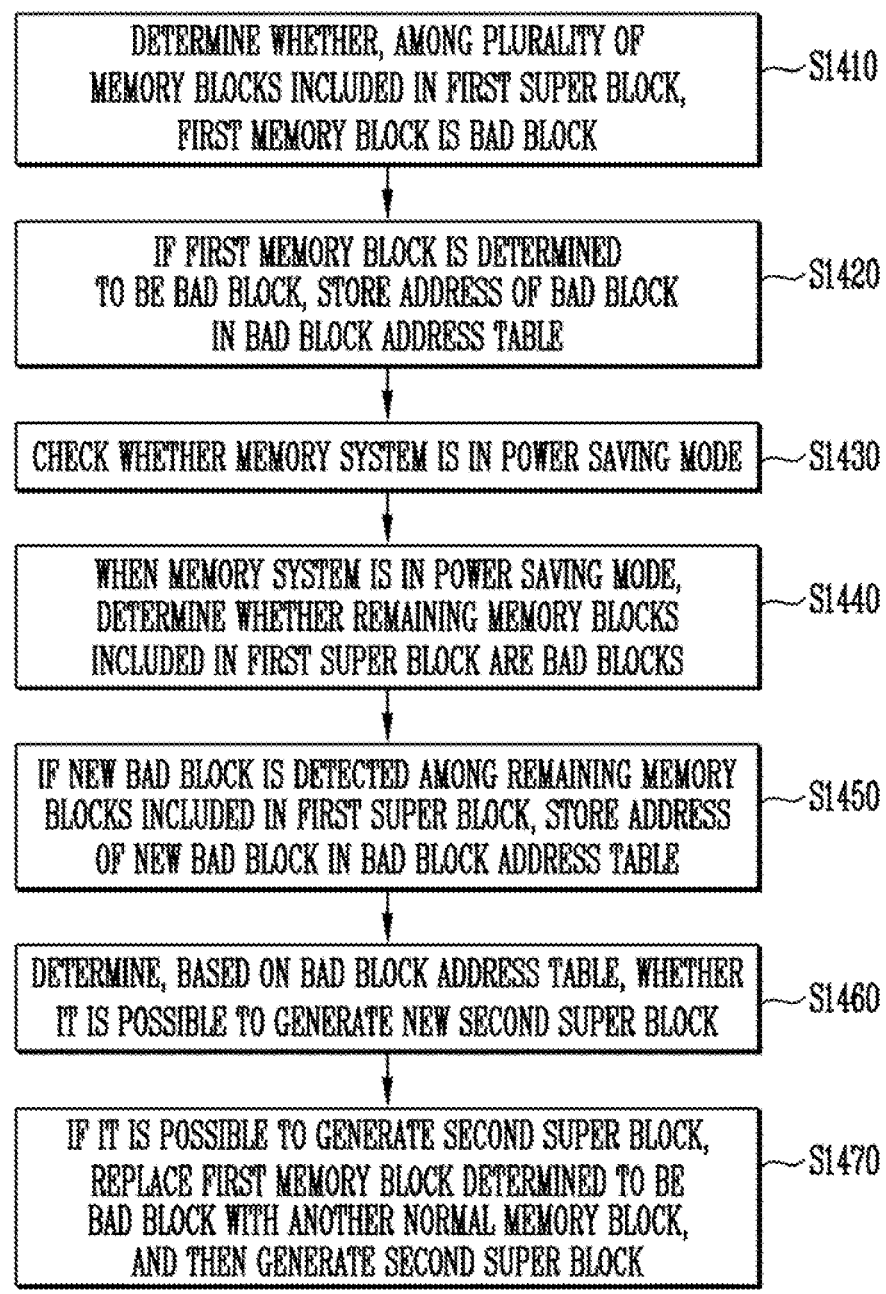
FIG. 14 is a flowchart describing in detail a method of generating a new super block.

FIG. 14 is a diagram describing in detail a method of generating a new super block.

Referring to FIG. 14, at step S1410, the memory system 1000 may determine whether, among a plurality of memory blocks 110 included in the first super block S_BLK1, the first memory block BLK1 110 is a bad block. Step S1410 may include the step of performing a program operation or a read operation on the first memory block BLK1 110 included in the first super block S_BLK1. Further, whether the first memory block is a bad block may be determined depending on whether the program operation or the read operation has failed.

If the first memory block BLK1 110 included in the first super block S_BLK1 is determined to be a bad block, the address of the bad block may be stored in the bad block address table at step S1420. Step S1420 may include the step of storing the address of the first super block S_BLK1 including the first memory block BLK1 110 determined to be the bad block. Further, step S1420 may include the step of dismantling the first super block S_BLK1 including the first memory block BLK1 110 determined to be the bad block. The step of dismantling the first super block S_BLK1 may be the operation of deleting the address of the first super block S_BLK1 from the bad block address table of the memory system 1000. The bad block address table may be managed by the bad block management unit 1204 of FIG. 8.

Thereafter, whether the memory system 1000 is in a power saving mode may be checked at step S1430. If the memory system 1000 is in the power saving mode, the memory system 1000 may determine whether the remaining memory blocks 110 included in the first super block S_BLK1, other than the first memory block BLK1 110, are bad blocks at step S1440. Thereafter, when a new bad block is detected among the remaining memory blocks 110 included in the first super block S_BLK1, other than the first memory block BLK1 110, the address of the new bad block may be stored in the bad block address table at step S1450. Steps S1440 and S1450 may be performed when the first memory block BLK1 110 has been determined to be a bad block due to a failure in the read operation, and may not be performed when the first memory block BLK1 has been determined to be a bad block due to a failure in the program operation.

At step S1460, the memory system 1000 may determine, based on the bad block address table, whether it is possible to generate a new second super block S_BLK2. Here, if it is determined that it is possible to generate a new second super block S_BLK2, the first memory block BLK1 110 determined to be the bad block may be replaced with a normal memory block, and then the second super block S_BLK2 may be generated at step S1470.

Thereafter, the memory system 1000 may perform a program operation, an erase operation, and a read operation on the newly generated second super block S_BLK2.

Figure 15:
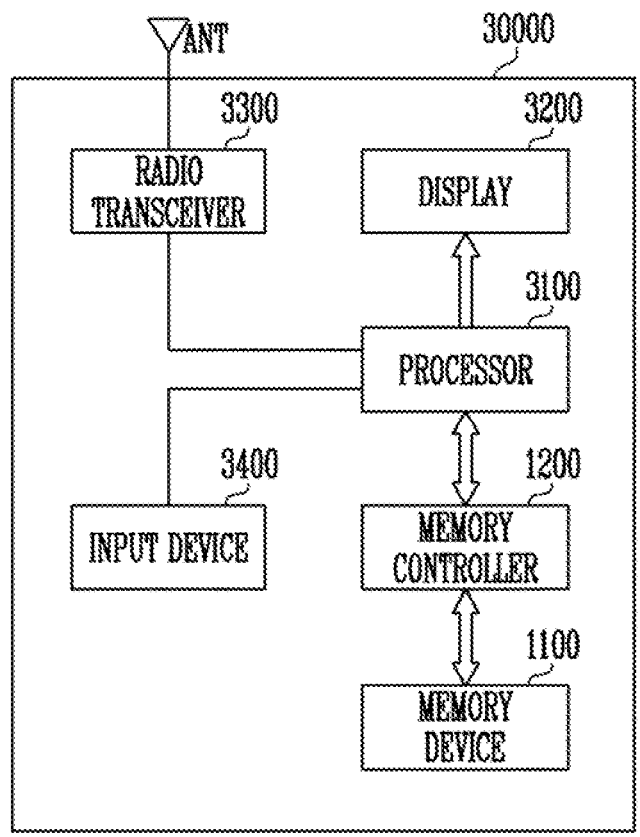
FIG. 15 is a diagram illustrating an embodiment of the memory system including the memory controller, illustrated in FIG. 8.

FIG. 15 is a diagram illustrating an application example of the memory system including the memory controller such as the one illustrated in FIG. 8.

Referring to FIG. 15, a memory system 30000 may be embodied in, for example, a cellular phone, a smartphone, a tablet PC, a personal digital assistant (PDA) or a wireless communication device. The memory system 30000 may include the memory device 1100 and a memory controller 1200 capable of controlling the operation of the memory device 1100. The memory controller 1200 may control a data access operation, e.g., a program, erase, or read operation, of the memory device 1100 under the control of a processor 3100.

Data programmed in the memory device 1100 may be output through a display 3200 under the control of the memory controller 1200.

A radio transceiver 3300 may send and receive radio signals through an antenna ANT. For example, the radio transceiver 3300 may change a radio signal received through the antenna ANT into a signal which may be processed by the processor 3100. Therefore, the processor 3100 may process a signal output from the radio transceiver 3300 and transmit the processed signal to the memory controller 1200 or the display 3200. The memory controller 1200 may program a signal processed by the processor 3100 to the memory device 1100. Furthermore, the radio transceiver 3300 may change a signal output from the processor 3100 into a radio signal, and output the changed radio signal to the external device through the antenna ANT. An input device 3400 may be used to input a control signal for controlling the operation of the processor 3100 or data to be processed by the processor 3100. The input device 3400 may be implemented as a pointing device such as a touch pad or a computer mouse, a keypad or a keyboard. The processor 3100 may control the operation of the display 3200 such that data output from the memory controller 1200, data output from the radio transceiver 3300, or data output from the input device 3400 is output through the display 3200.

In an embodiment, the memory controller 1200 capable of controlling the operation of the memory device 1100 may be implemented as a part of the processor 3100 or a chip provided separately from the processor 3100. Further, the memory controller 1200 may be implemented through the example of the memory controller illustrated in FIG. 8.

Figure 16:
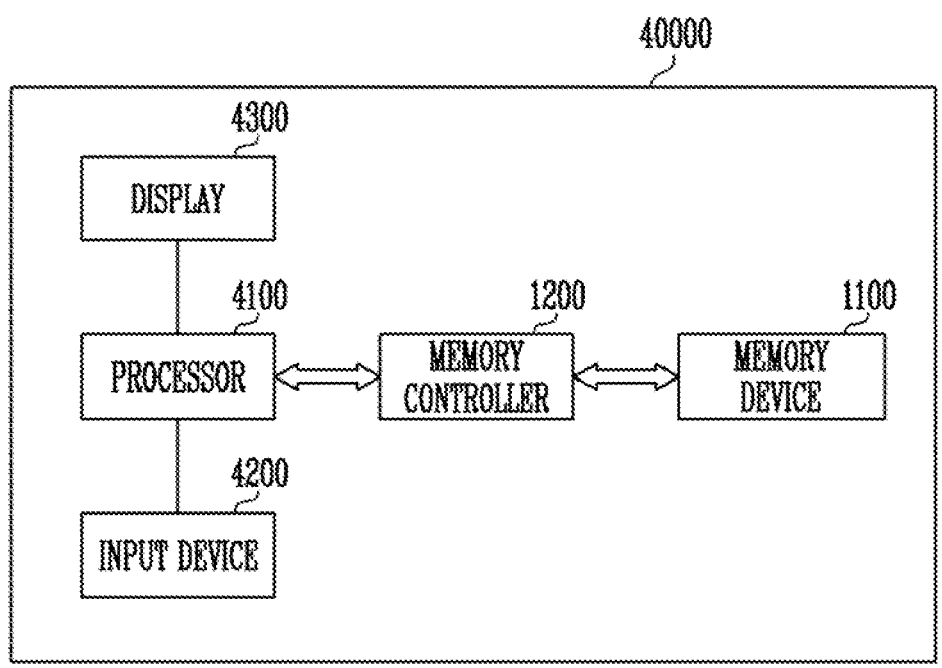
FIG. 16 is a diagram illustrating an embodiment of the memory system including the memory controller, illustrated in FIG. 8.

FIG. 16 is a diagram illustrating an application example of the memory system including the memory controller such as the one illustrated in FIG. 8.

Referring to FIG. 16, a memory system 40000 may be embodied in, for example, a personal computer, a tablet PC, a net-book, an e-reader, a personal digital assistant (PDA), a portable multimedia player (PMP), an MP3 player, or an MP4 player.

The memory system 40000 may include the memory device 1100 and a memory controller 1200 capable of controlling the data processing operation of the memory device 1100.

A processor 4100 may output data stored in the memory device 1100 through a display 4300, according to data input from an input device 4200. For example, the input device 4200 may be implemented as a point device such as a touch pad or a computer mouse, a keypad or a keyboard.

The processor 4100 may control the overall operation of the memory system 40000 and control the operation of the memory controller 1200. In an embodiment, the memory controller 1200 capable of controlling the operation of the memory device 1100 may be implemented as a part of the processor 4100 or a chip provided separately from the processor 4100. Further, the memory controller 1200 may be implemented through the example of the memory controller illustrated in FIG. 8.

Figure 17:
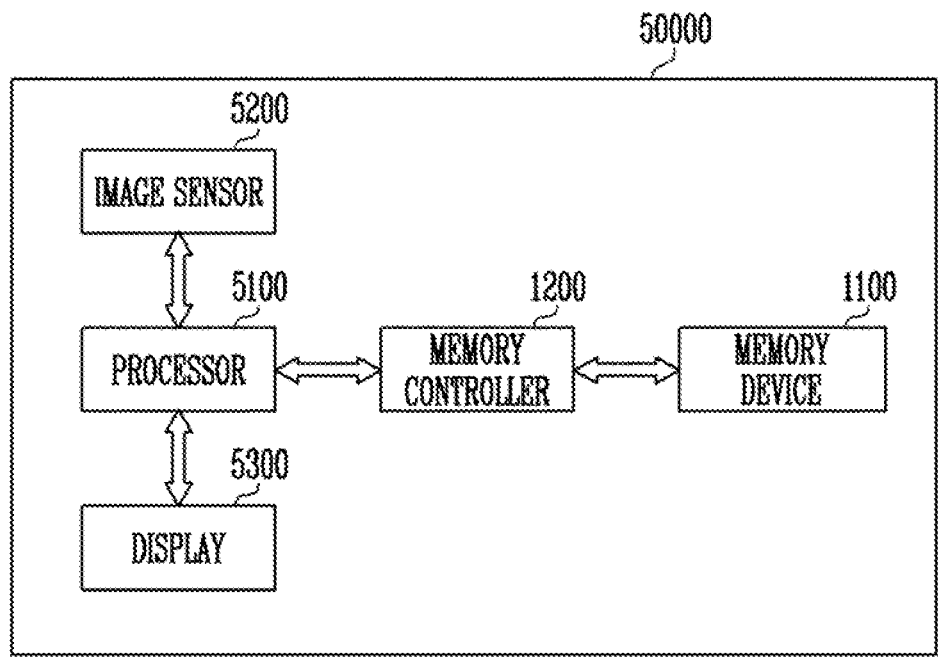
FIG. 17 is a diagram illustrating an embodiment of the memory system including the memory controller, illustrated in FIG. 8.

FIG. 17 is a diagram illustrating an application example of the memory system including the memory controller, illustrated in FIG. 8.

Referring to FIG. 17, a memory system 50000 may be embodied in, for example, an image processing device, e.g., a digital camera, a portable phone provided with a digital camera, a smartphone provided with a digital camera, or a tablet PC provided with a digital camera.

The memory system 50000 may include the memory device 1100 and a memory controller 1200 capable of controlling a data processing operation, e.g., a program, erase, or read operation, of the memory device 1100.

An image sensor 5200 of the memory system 50000 may convert an optical image into digital signals. The converted digital signals may be transmitted to a processor 5100 or the memory controller 1200. Under the control of the processor 5100, the converted digital signals may be output through a display 5300 or stored in the memory device 1100 through the memory controller 1200. Data stored in the memory device 1100 may be output through the display 5300 under the control of the processor 5100 or the memory controller 1200.

In an embodiment, the memory controller 1200 capable of controlling the operation of the memory device 1100 may be implemented as a part of the processor 5100, or a chip provided separately from the processor 5100. Further, the memory controller 1200 may be implemented through the example of the memory controller illustrated in FIG. 8.

Figure 18:
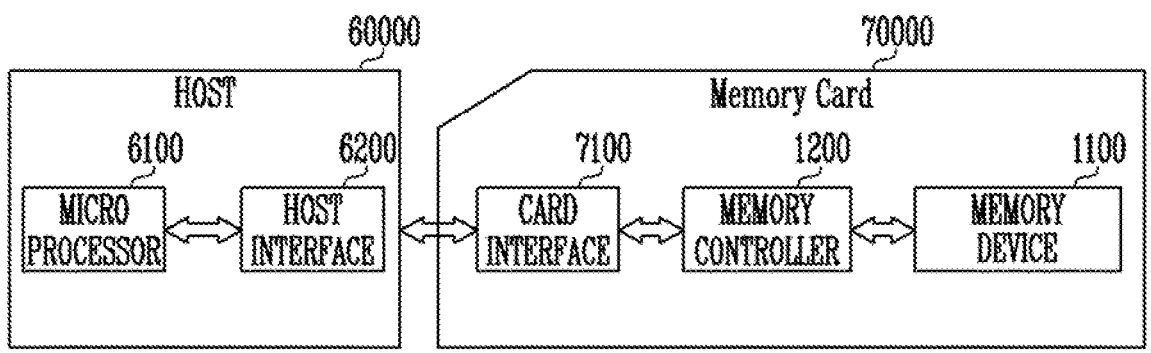
FIG. 18 is a diagram illustrating an embodiment of the memory system including the memory controller, illustrated in FIG. 8.

FIG. 18 is a diagram illustrating an application example of the memory system including the memory controller, illustrated in FIG. 8.

Referring to FIG. 18, a memory system 70000 may be embodied in a memory card or a smart card. The memory system 70000 may include the memory device 1100, a memory controller 1200 and a card interface 7100.

The memory controller 1200 may control data exchange between the memory device 1100 and the card interface 7100. In an embodiment, the card interface 7100 may be a secure digital (SD) card interface or a multi-media card (MMC) interface, but it is not limited thereto. Further, the memory controller 1200 may be implemented through the example of the memory controller illustrated in FIG. 8.

The card interface 7100 may interface data exchange between a host 60000 and the memory controller 1200 according to a protocol of the host 60000. In an embodiment, the card interface 7100 may support a universal serial bus (USB) protocol, and an inter-chip (IC)-USB protocol. Here, the card interface may refer to hardware capable of supporting a protocol which is used by the host 60000, software installed in the hardware, or a signal transmission method.

When the memory system 70000 is connected to a host interface 6200 of the host 60000 such as a PC, a tablet PC, a digital camera, a digital audio player, a cellular phone, console video game hardware or a digital set-top box, the host interface 6200 may perform data communication with the memory device 1100 through the card interface 7100 and the memory controller 1200 under the control of a microprocessor 6100.

The present disclosure may replace a bad block in a super block in which the bad block occurs with a normal memory block in the operation of the memory system and may then generate a new super block, thus extending the lifespan of the memory system.

Examples of embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory system, comprising:
   a memory controller; and
   a plurality of memory devices coupled to the memory controller through a channel,
   wherein the memory controller sets memory blocks respectively included in the plurality of memory devices as a first super block,
   wherein, when a memory block among the memory blocks in the first super block is determined as a bad block, the memory controller generates a second super block by replacing the memory block with a normal memory block included in another super block, and
   wherein, when the memory system is in a power saving mode, the memory controller performs a determination operation of determining whether rest memory blocks other than the memory block included in the first super block are bad blocks.

2. The memory system according to claim 1, wherein the memory controller is configured to perform simultaneously an erase operation on the memory blocks included in the first super block.

3. The memory system according to claim 2, wherein the normal memory block is included in a memory device including the memory block determined to be the bad block.

4. The memory system according to claim 3, wherein the memory controller is configured to store an address of the memory block determined to be the bad block.

5. The memory system according to claim 4, wherein the memory block determined to be the bad block has failed in a program operation.

6. The memory system according to claim 4, wherein the memory block determined to be the bad block has failed in a read operation.

7. The memory system according to claim 1, wherein the power saving mode is executed in response to a command inputted from a host.

8. A memory system, comprising:
   a memory controller comprising a bad block management unit and a plurality of channel interfaces;
   a plurality of channels; and
   first and second super blocks,
   wherein each of the plurality of channel interfaces corresponds to any one of the plurality of channels, wherein each of the plurality of channels is coupled to a plurality of memory devices that constitute different ways, respectively, wherein each of the plurality of memory devices comprises a plurality of memory blocks, wherein each of the first and second super blocks includes memory blocks included in the different ways, among the plurality of memory blocks, and wherein, when one or more memory blocks included in the first super block and one or more memory blocks included in the second super block are determined to be bad blocks, the bad block management unit is configured to generate a new super block using normal memory blocks that are included in the first super block and the second super block.

9. The memory system according to claim 8, wherein:
the memory controller further comprises an error correction unit,
the error correction unit is configured to perform an error correction operation when a read operation is performed on each memory block, and
the bad block management unit is configured to determine a memory block on which the error correction operation is performed, to be a bad block when the error correction operation has failed.

10. The memory system according to claim 8, wherein the bad block management unit is configured to perform an operation of determining the memory block on which the error correction operation is performed, to be a bad block in a power saving mode.

11. The memory system according to claim 10, wherein the power saving mode is executed in response to a command inputted from a host.

12. A method of operating a memory system, comprising:
determining whether a first memory block included in a first super block is a bad block;
storing an address of the first memory block in a bad block address table based on a result of the determination;
checking, based on the bad block address table, whether remaining memory blocks other than the first memory block are bad blocks and whether it is possible to generate a new super block;
generating a second super block by replacing the first memory block with a second memory block included in a super block other than the first super block based on a result of the checking; and
before determining whether the remaining memory blocks other than the first memory block are the bad blocks, checking whether a current mode is a power saving mode,
wherein the determining whether the remaining memory blocks other than the first memory block are the bad blocks is performed based on a result of checking whether the current mode is the power saving mode, and
wherein a plurality of memory blocks included in the second super block are included in different memory devices, respectively.

13. The method according to claim 12, wherein the determining comprises performing a program operation or a read operation on the first memory block.

14. The method according to claim 12, wherein the plurality of memory blocks included in the second super block are coupled in common to a single channel.

15. The method according to claim 12, further comprising performing an erase operation simultaneously on the plurality of memory blocks included in the second super block.

16. A memory system comprising:
a plurality of super blocks each including a plurality of memory blocks of memory devices; and
a memory controller configured to detect at least one bad block in a first super block among the super blocks, and construct a second super block by replacing any bad block included in the first super block with a normal block included in a super block other than the first super block,
wherein the any bad block and the normal block are included in a same memory device, and
wherein, when the memory system is in an idle state, the memory controller performs a determination operation of determining whether rest memory blocks other than the memory block included in the first super block are bad blocks.

* * * * *